G. WALTHER.
CUSHIONED WHEEL.
APPLICATION FILED OCT. 8, 1917.

1,287,802.

Patented Dec. 17, 1918
2 SHEETS—SHEET 1.

INVENTOR
George Walther,
BY
Edward L. Reed
ATTORNEY

G. WALTHER.
CUSHIONED WHEEL.
APPLICATION FILED OCT. 8, 1917.
1,287,802.
Patented Dec. 17, 1918.
2 SHEETS—SHEET 2.
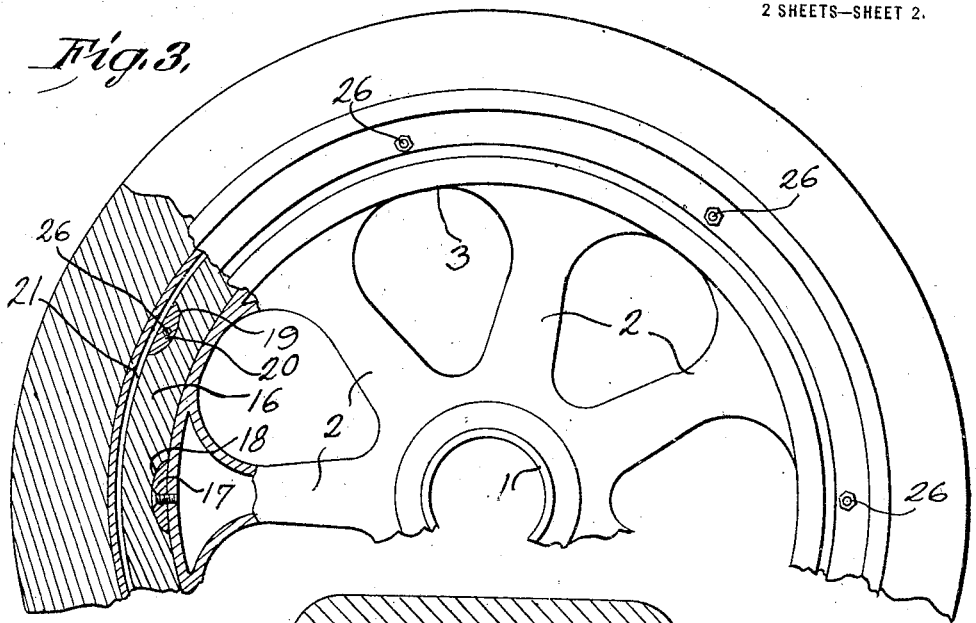
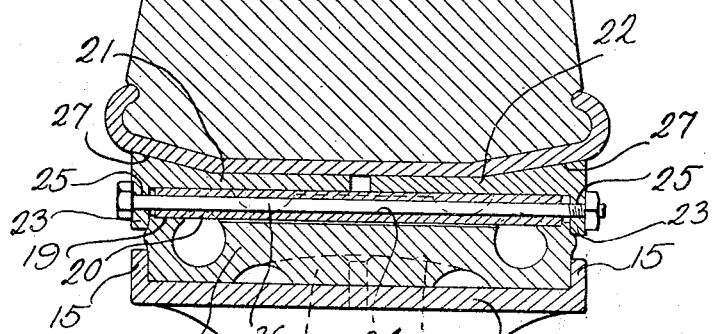
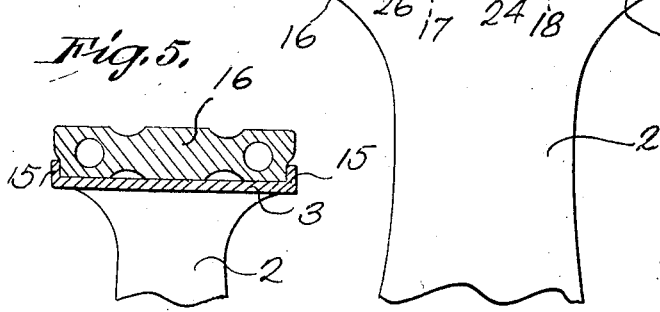
INVENTOR
George Walther,
BY
Edward H. Reed
ATTORNEY

UNITED STATES PATENT OFFICE.

GEORGE WALTHER, OF DAYTON, OHIO.

CUSHIONED WHEEL.

1,287,802.

Specification of Letters Patent.

Patented Dec. 17, 1918.

Application filed October 8, 1917. Serial No. 195,275.

*To all whom it may concern:*

Be it known that I, GEORGE WALTHER, a citizen of the United States, residing at Dayton, in the county of Montgomery and State of Ohio, have invented certain new and useful Improvements in Cushioned Wheels, of which the following is a specification, reference being had therein to the accompanying drawing.

This invention relates to cushioned wheels and more particularly to a cushioned wheel designed for use with heavy automobile trucks or the like, although it is useful with wheels of various kinds.

The object of the invention is to provide a cushioned wheel which will have ample cushioning action without seriously impairing its strength.

It is also an object of the invention to provide a cushioning device which will maintain the space between the two rims closed at all times; and to make it impossible for the outer wheel to be crushed off the inner wheel by lateral strains.

It is also an object of the invention to so construct the wheel that it can be readily assembled; and that the cushioning device, when the wheel is assembled, will be firmly secured to both rims.

A further object of the invention is to provide a wheel of this kind which will be very simple in its construction; which will comprise but few parts; and will have these parts of such a character that they can be easily manufactured.

Figure 1:
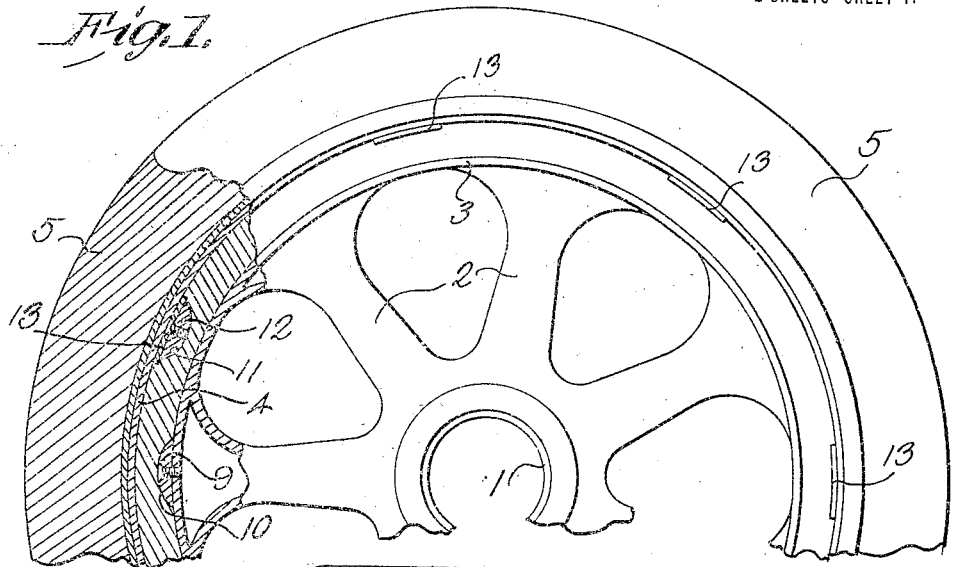
Figure 2:
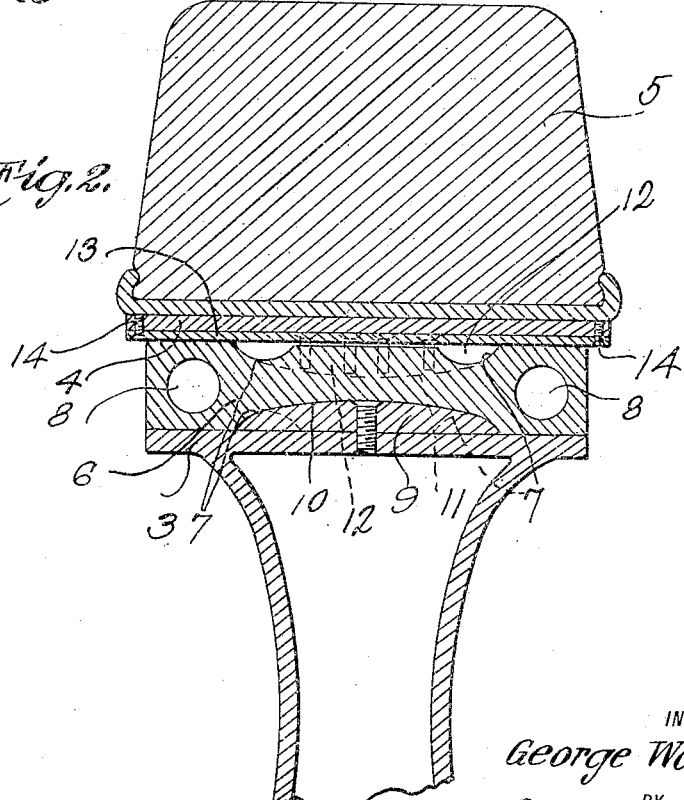

In the accompanying drawings Figure 1 is a side elevation, partly in section, of a portion of a wheel embodying my invention; Fig. 2 is a section taken transversely of the rim of such a wheel; Fig. 3 is a side elevation partly broken away of a modified form of the invention; Fig. 4 is a sectional view taken transversely of the view shown in Fig. 3; and Fig. 5 is a cross sectional detail of the rubber cushion, on a reduced scale.

In these drawings I have illustrated one embodiment of my invention and have shown the same as applied to a metal wheel having the hub 1, the spokes 2 and the inner rim 3 cast in one piece, but it will be understood that the particular type of wheel to which the invention is applied is immaterial so long as the inner rim is of a suitable character to receive the cushion device. The wheel is provided with an outer rim 4 of a diameter sufficiently greater than the diameter of the inner rim to provide a space between the two rims within which to mount the cushioning device. This outer rim may be of any suitable character, but as here shown is adapted to carry a rubber tire 5, which may be secured thereto in any suitable manner. Interposed between the two rims is a cushioning device 6 of resilient material, such as soft rubber. This cushioning device is preferably formed in a single piece and is here shown as an annular band of soft rubber extending completely about the inner rim and of a width substantially equal to the width of said inner rim. One, or both, surfaces of the cushion is provided with depressions to permit the body of material to be distorted under pressure, thus providing the cushion with a greater yieldability than it would have if the cushion fit snugly against the rims throughout its width and was capable of distortion at the edges only. These depressions may be arranged in any desired manner, but as here shown I have formed in both the inner and outer surfaces of the cushion two circumferential grooves, as shown at 7, which are spaced substantially midway between the center of the cushion and the lateral edges thereof, although their exact location is not of importance. When the wheel is under load the lower portion of the cushion will be compressed and the inner rim will move downwardly with relation to the outer rim, thus decreasing the space between the two rims at the lower portion of the wheel and increasing this space at the upper portion of the wheel. If the cushion is of such a thickness that it merely fills the space between the two rims when they are in their normal or equidistant positions this downward movement of the inner rim will so increase the distance between the two rims at the upper portion of the wheel as to leave a space between the cushion and the upper portion of one of the rims, into which dust or other foreign matter may enter. To avoid this result I have so constructed the cushion that it will completely fill the space between the two rims in all relative positions of the two rims into which they are likely to be moved in ordinary service. This I accomplish by forming the lateral portions of the cushion, which in the present instance lie beyond the grooves 7, of a greater thickness and of a greater resiliency than the central portion of the cushion, which lies between the grooves. The central, or load-carrying portion, of the cushion is of a thickness substantially equal to the distance between the two rims when the rims are in their normal or equidistant positions, while the edge portions are of a thickness greater than this distance and will consequently be under slight compression when the two rims are in their normal positions. When the wheel is under load and the inner rim moves downward relatively to the outer rim, the outer portions of the cushion will expand sufficiently to increase their thickness to correspond with the increased distances between the two rims at the upper portion thereof, thus maintaining the space between the rims completely closed at all times. In the present instance the outer or thicker portions of the cushion are provided with circumferential openings 8 to increase their resiliency, although this may be accomplished in various ways. This construction of the cushion not only serves to maintain the space between the rims permanently closed but it also increases the cushioning action of the device, because although the outer portions yield more readily than does the inner portion of the cushion they nevertheless absorb a part of the thrust before it is exerted upon the inner load-carrying portion of the cushion.

Means are provided for retaining the cushion firmly in position between the two rims and if desired this means may be such that the cushion will constitute the sole connection between the two rims, as is the case in both forms of the invention here illustrated, although obviously other connections can be provided should this be necessary, so long as these other connections do not interfere with the action of the cushion. I prefer to connect the cushion with the rim by providing the cushion and the respective rims with interlocking parts, preferably in the form of lugs carried by one member and adapted to enter recesses in the other member. In the present construction, I have shown the inner rim provided with a series of projections, preferably in the form of lugs 9 rigidly secured thereto, spaced apart about the circumference thereof and, in the present instance, corresponding in number with the number of spokes and arranged in alinement with the respective spokes. The cushion is provided with recesses or depressions, 10, adapted to receive the respective lugs 9, which fit snugly within the recesses. The character and arrangement of the recesses and lugs are such as to permit the cushion to be sprung into position on the inner rim and, when the lugs are properly seated in their recesses, to firmly hold the cushion against bodily movement relatively to the inner rim either circumferentially or transversely thereof. The outer surface of the cushion is provided with a series of recesses 11 spaced about the circumference thereof. In the present construction these recesses are also equal in number to the number of spokes and are arranged alternately with the recesses 10 in the cushion, but obviously this number can be varied if this should seem desirable. The outer rim is provided with lugs adapted to enter the respective recesses, and to facilitate the placing of the outer rim on the cushion I have formed these lugs separate from the outer rim so that they can be placed in position before the outer rim is mounted on the cushion, and then secured to that rim. In the construction shown in Figs. 1 and 2 each lug comprises a block of metal, 12, which is rigidly secured to a strip of metal, 13, extending transversely of the cushion and of a length greater than the width of the cushion. These blocks or lugs are adapted to fit snugly within their respective recesses 11 and after they have been placed in position the outer rim is slipped over the strips 13, and when this rim is in the proper position, the strips 13 are rigidly secured thereto. In the present instance the length of the strips is about equal to the width of the outer rim, which projects beyond the edges of the cushion, and they are attached thereto by means of attaching devices, such as the screws 14, thus firmly securing the outer rim to the cushion, and inasmuch as the cushion is firmly secured to the inner rim it will be apparent that the two rims are firmly connected one to the other.

In that form of the invention shown in Figs. 1 and 2 I depend upon the interlocking connections between the cushion and the inner and outer rims to hold the several parts against lateral movement relatively one to the other. In Figs. 3 and 4 I have illustrated a slightly modified form of the invention in which additional means are provided to prevent the lateral movement of the rims and cushion relatively one to the other. As shown in these figures the wheel is constructed substantially as above described, the hub 1, spokes 2, and rim 3 being cast integral. The inner rim 3 is similar to the inner rim already described with the exception that it has on each edge an outwardly extending flange 15. A cushion 16, which may be similar to the one above described, is mounted on the inner rim between the flanges 15, which firmly hold the same against lateral displacement, while the projecting lugs 17 of the inner rim extend into the sockets, or recesses, 18, of the cushion and effectually hold the cushion against circumferential movement relatively to the rim. The outer rim and cushion are provided with interlocking parts to hold the same against circumferential movement relatively one to the other, but these interlocking parts are not relied upon to hold the rim and the cushion against relative lateral movement. The cushion is provided in its outer surface with a series of recesses 19 which, in this form of the device, may if desired extend across the cushion. These recesses are adapted to receive lugs, or locking devices, 20, which are placed therein before the outer rim is placed in position thereon and are then secured to the outer rim after the latter has been applied to the cushion. In this form of the device also I have provided an outer rim which is adapted to carry a rubber tire, and have shown this rim as divided circumferentially into two substantially equal parts, to enable the wheel to be readily assembled. This two part rim is indicated by the reference numerals 21 and 22, and each part has a depending flange 23 which overlaps the adjacent edges of the cushion and holds the cushion and the outer rim against relative lateral movement. The lugs 20 may be secured to the rim in any suitable manner, but I prefer to utilize for this purpose the same bolt by means of which the two part rim is secured to the cushion and to the tire. To this end the lugs 20 are provided with longitudinal openings 24 and the flanges 23 have openings 25 adapted to be positioned in alinement with the openings in the respective lugs 20. Bolts 26 extend through the openings in the flanges and in the lugs and serve to connect together the two parts of the rim and to secure the lugs rigidly to the rim. The tire is preferably secured to the outer rim by use of wedge-shaped rings. In the construction here shown these rings are provided by thickening and tapering the edges of the parts 21 and 22 of the rim, as shown at 27, and these tapered or wedge-shaped edges are drawn into clamping engagement with the metal base of the tire when the bolts 26 are tightened. The flanges 15 and 23, on the inner and outer rims, are of such width that there will always be a space between the adjacent edges of the flanges on the corresponding sides of the cushion, thus allowing for the compression of the cushion. In order to facilitate the assembling of the wheel the cushion may, if desired, have its outer portion of a width greater than the normal distance between the flanges 23, instead of having its lateral edges of increased thickness. When the flanges are drawn to their normal positions, by the bolts 26, the rubber of the cushion will be distorted and the lateral portions of the cushion will be thickened, thus giving the same effect as if the lateral portions had been made of greater thickness in the first place, but enabling the outer rim to be more easily placed about the cushion. This form of construction has substantially the same advantages as has that shown in Figs. 1 and 2, but has also additional means for securing the several parts firmly against lateral displacement, which, under certain circumstances, may be desirable.

It will be apparent from the foregoing description that the cushioning device, as I have constructed it, has a very high degree of cushioning action and is of such a character as to retain the space between the two rims permanently closed. Further it will be apparent that the construction is such that the wheel may be readily assembled and that when the wheel is assembled the cushion will be held firmly against displacement relatively to the two rims. The character of the parts is such that they are easily formed and, consequently, can be produced at a relatively low cost.

While I have shown and described one embodiment of my invention I wish it to be understood that I do not desire to be limited to the details of construction as various modifications will occur to persons skilled in the art.

Having now fully described my invention, what I claim as new and desire to secure by Letters Patent, is:—

1. In a wheel, an inner rim, an outer rim of greater diameter than said inner rim, said rims having their adjacent surfaces substantially parallel one to the other and having their adjacent lateral edges spaced apart, a cushioning device of yieldable material interposed between said rims and having its edge portions of greater thickness than the central portion thereof to maintain the spaces between the edges of said rims closed.

2. In a wheel, an inner rim, an outer rim of greater diameter than said inner rim, a cushion of yieldable material interposed between said rims and having its lateral edge portions of a thickness greater than the thickness of the intermediate portion thereof, and greater than the normal distance between the adjacent portions of said rims.

3. In a wheel, an inner rim, an outer rim of greater diameter than said inner rim, a cushion of yieldable material interposed between said rims and having its lateral edge portions of a thickness greater than the thickness of the intermediate portion thereof and greater than the normal distance between said rims, and of a greater yieldability than the intermediate portion of said cushion.

4. In a wheel, an inner rim, an outer rim of greater diameter than said inner rim, an annular band of yieldable material interposed between said rims and having its central portion of a thickness substantially equal to the normal distance between said rims and having its lateral edge portions of a thickness greater than the thickness of said central portion and of a greater yieldability than said central portion, and having circumferential depressions arranged between said central portion and said lateral portions.

5. A cushion for a wheel comprising a relatively wide, flat annular band of yieldable material having in both its inner and outer surfaces circumferential grooves, the grooves in each surface being spaced one from the other, said band also having circumferential openings formed therein between the lateral edges thereof, and the respective grooves.

6. A cushion for a wheel comprising an annular band of yieldable material having in both its inner and outer surfaces circumferential grooves, the grooves in each surface being spaced one from the other, said band also having its lateral portions of greater thickness than the intermediate portion thereof and having in each of said lateral portions a circumferential opening.

7. In a wheel, an inner rim, an outer rim of greater diameter than said inner rim, a cushion of yieldable material interposed between said rims, and devices for connecting said outer rim to said cushion, said devices being adapted to be applied to said cushion before said outer rim is placed in position thereon and to be connected to said outer rim after it has been placed in position on said cushion.

8. In a wheel, an inner rim, an outer rim of greater diameter than said inner rim, a cushion of yieldable material interposed between said rims, said cushion having recesses in that surface thereof adjacent to said outer rim, lugs adapted to enter said recesses, and means to secure said lugs to said outer rim after the latter has been placed in position on said cushion.

9. In a wheel, an inner rim, an outer rim of greater diameter than said inner rim, a cushion of yieldable material interposed between said rims, said cushion and said inner rim having interlocking parts so arranged that said cushion may be sprung into position on said inner rim, said cushion having recesses in that surface thereof adjacent to said outer rim, lugs adapted to enter the respective recesses, and means to secure said lugs to said outer rim after the latter has been placed in position on said cushion.

10. In a wheel, an inner rim, an outer rim of greater diameter than said inner rim, a cushion of yieldable material interposed between said rims, said cushion having recesses in that surface thereof adjacent to said outer rim, lugs adapted to enter the respective recesses, strips of metal secured to the respective lugs, extending transversely of said cushion and adapted to be secured to said outer rim after it has been placed in position on said cushion.

11. In a wheel, an inner rim having lugs spaced about the periphery thereof, an outer rim of greater diameter than said inner rim, an annular band of yieldable material interposed between said rims and having a series of recesses in the inner side thereof to receive the respective lugs on said inner rim, and also having a series of recesses in the outer surface thereof, a series of lugs formed separate from said outer rim and adapted to enter the recesses in said band, and means for connecting said lugs with said outer rim after the latter has been placed in position on said cushion.

12. In a wheel, an inner rim having lugs spaced about the periphery thereof, an outer rim of greater diameter than said inner rim, an annular band of yieldable material interposed between said rims and having a series of recesses in the inner side thereof to receive the respective lugs on said inner rim, and also having a series of recesses in the outer surface thereof, a series of lugs formed separate from said outer rim and adapted to enter the recesses in said band, and means for connecting said lugs with said outer rim after the latter has been placed in position on said cushion, said cushion also having circumferentially extending depressions formed in the inner and outer surfaces thereof.

13. In a wheel, an inner rim, an outer rim of greater diameter than the inner rim and having inwardly extending flanges at its lateral edges, a cushion of yieldable material interposed between said rims and between the flanges of said outer rim, said cushion having recesses in that surface thereof adjacent to said outer rim, lugs removably mounted in said recesses, and means for securing said lugs to said outer rim after the latter has been placed in position about said cushion.

14. In a wheel, an inner rim, an outer rim of greater diameter than the inner rim and having inwardly extending flanges at its lateral edges, a cushion of yieldable material interposed between said rims and between the flanges of said outer rim, said cushion having recesses in that surface thereof adjacent to said outer rim, lugs removably mounted in said recesses, and bolts for securing said lugs to the flanges of said outer rim.

15. In a wheel, an inner rim, an outer rim divided circumferentially into two parts and having at its lateral edges inwardly extending flanges, a cushion of yieldable material interposed between said rims and between the flanges of said outer rim and having recesses in the outer surface thereof, lugs removably mounted in said recesses, and bolts extending through said flanges and through the respective lugs to connect together the two parts of said outer rim and to secure said lugs thereto.

16. In a wheel, an inner rim having outwardly extending flanges at its lateral edges, an outer rim having inwardly extending flanges at its outer edges, a cushion of yieldable material interposed between said rims, said cushion and said inner rim having interlocking parts to hold the cushion and rim against relative circumferential movement, said cushion also having recesses in the outer surface thereof, lugs mounted in said recesses, and means for detachably securing said lugs to said outer rim, the combined width of the corresponding flanges on said inner and outer rim being less than the thickness of said cushion.

17. In a wheel, an inner rim having outwardly extending flanges at its lateral edges, an outer rim having inwardly extending flanges at its lateral edges and divided circumferentially into two parts, a cushion of yieldable material interposed between said rims and of such a thickness as to maintain the flanges of the outer rim normally spaced away from the flanges of the inner rim, said cushion and said inner rim having interlocking parts, and said cushion having recesses in its outer surface extending for the full width thereof, elongated lugs mounted in said recesses, and bolts for connecting together the two parts of said outer rim and for securing said lugs thereto after the several parts have been assembled.

18. In a wheel, an inner rim, an outer rim divided circumferentially into two parts and having at its lateral edges inwardly extending flanges, a cushion of yieldable material interposed between said rims and between the flanges of said outer rim, that portion of said cushion which is arranged between the flanges of said outer rim being of greater width than the normal distance between said flanges, and said cushion also having recesses in the outer surface thereof, lugs mounted in said recesses, and bolts extending through said flanges and through the respective lugs to draw together the two parts of said outer rim and compress said cushion between the flanges thereof and to secure said lugs to said rim.

19. In a wheel, an inner rim, an outer rim divided circumferentially into two parts and having at its lateral edges inwardly extending flanges, a cushion of yieldable material interposed between said rims and between the flanges of said outer rim, that portion of said cushion which lies between the flanges of said outer rim being of greater width than the normal space between said flanges, and means to draw said flanges together to compress said cushion between them.

20. In a wheel, an inner rim, an outer rim of greater diameter than said inner rim, a cushion of yieldable material interposed between said rims, a tire to be secured to said outer rim and having a base, the lateral edges of which are inclined outwardly, said outer rim being divided circumferentially into two parts and each part being provided with a projection to engage the adjacent inclined edge of the base of said tire, means for drawing together the two parts of said rim to move said projections into clamping engagement with said tire.

21. In a wheel, an inner rim, an outer rim of greater diameter than said inner rim and having inwardly extending flanges, a cushion of yieldable material interposed between said rims and having that portion arranged between said flanges of greater width than the normal distance between said flanges, a tire to be secured to said outer rim and having a base, the lateral edges of which are inclined outwardly, said outer rim being divided circumferentially into two parts and each part being provided with a projection to engage the adjacent inclined edge of the base of said tire, and means for drawing together the two parts of said rim to move said projections into clamping engagement with said tire and to cause said flanges to compress the cushion between them.

In testimony whereof, I affix my signature hereto.

GEORGE WALTHER.